United States Patent [19]

Laws et al.

[11] 4,233,959
[45] Nov. 18, 1980

[54] STORAGE OF THERMAL ENERGY

[75] Inventors: William R. Laws, Worcester Park; Geoffrey R. Reed, Tadworth, both of England

[73] Assignee: Encomech Engineering Services Ltd., Epsom, England

[21] Appl. No.: 15,042

[22] Filed: Feb. 26, 1979

[30] Foreign Application Priority Data

Feb. 27, 1978 [GB] United Kingdom ................ 7752/78

[51] Int. Cl.³ .............................................. F24J 3/02
[52] U.S. Cl. .................................. 126/426; 126/436; 126/400; 165/DIG. 4
[58] Field of Search ........................ 126/270, 271, 400; 237/1 A; 165/104 S, DIG. 4, DIG. 18, 12

[56] References Cited

U.S. PATENT DOCUMENTS

| 3,972,316 | 8/1976 | Alkasab | 126/271 |
| 4,002,031 | 1/1977 | Bell | 126/271 |
| 4,038,972 | 8/1977 | Orrison | 126/271 |
| 4,112,918 | 9/1978 | Palkes | 126/270 |
| 4,134,387 | 1/1979 | Tornstrow | 126/271 |

Primary Examiner—Samuel Scott
Assistant Examiner—Gerald Anderson

[57] ABSTRACT

Thermal energy storage apparatus has a heat-insulating casing containing a length of flexible material extending between a pair of driven mandrels so that the material can be wound on either mandrel selectively. Between the mandrels the unwound material is heated as it passes a window in the casing through which solar energy is focused, and the heated material is collected in closely coiled form on the receiving mandrel, where it has a low exposed surface area for its thermal mass, to store the heat received. The stored energy is extracted from the coiled material by winding it onto the other mandrel while a gas flow is passed over the unwound material.

9 Claims, 3 Drawing Figures

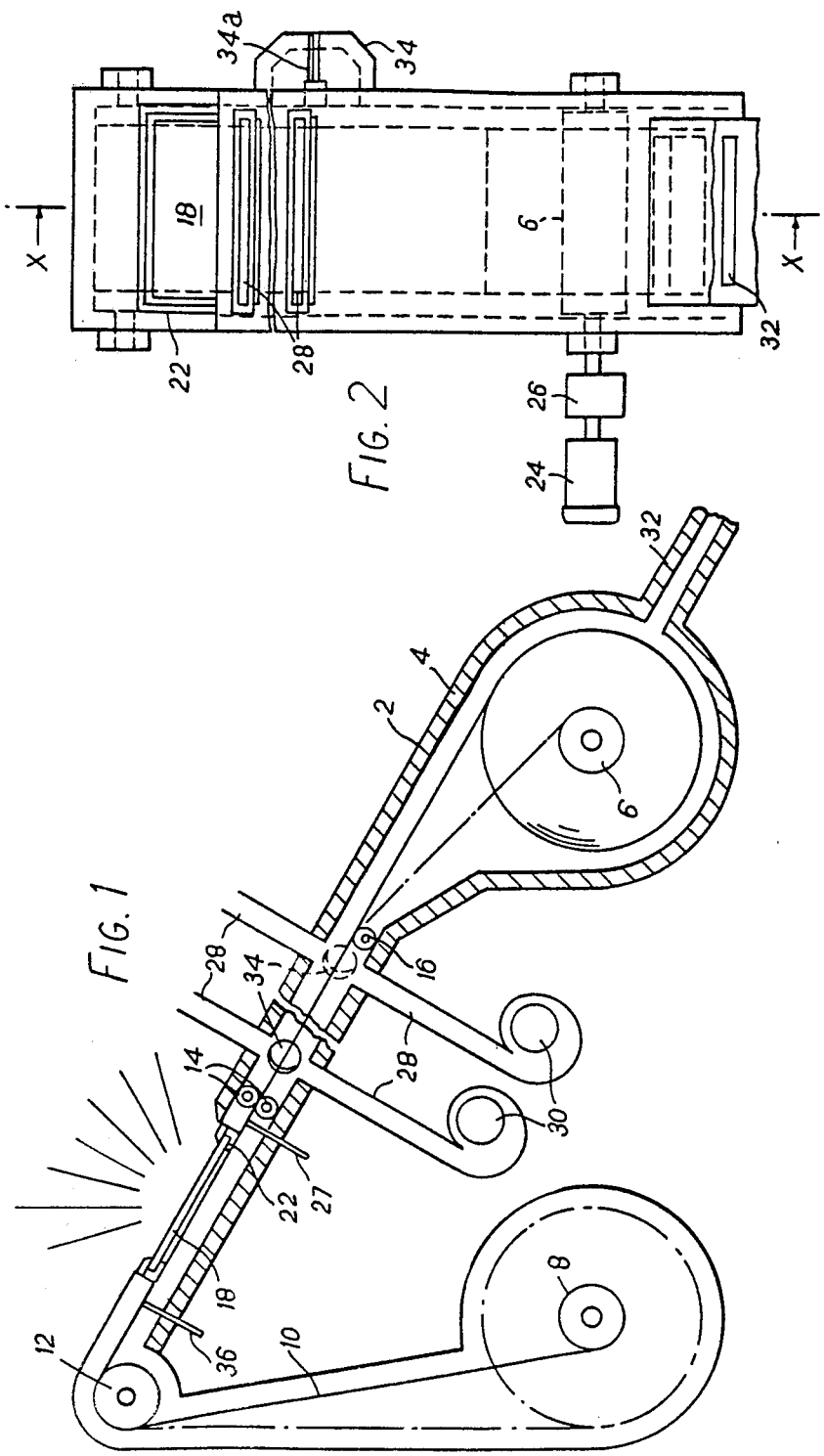

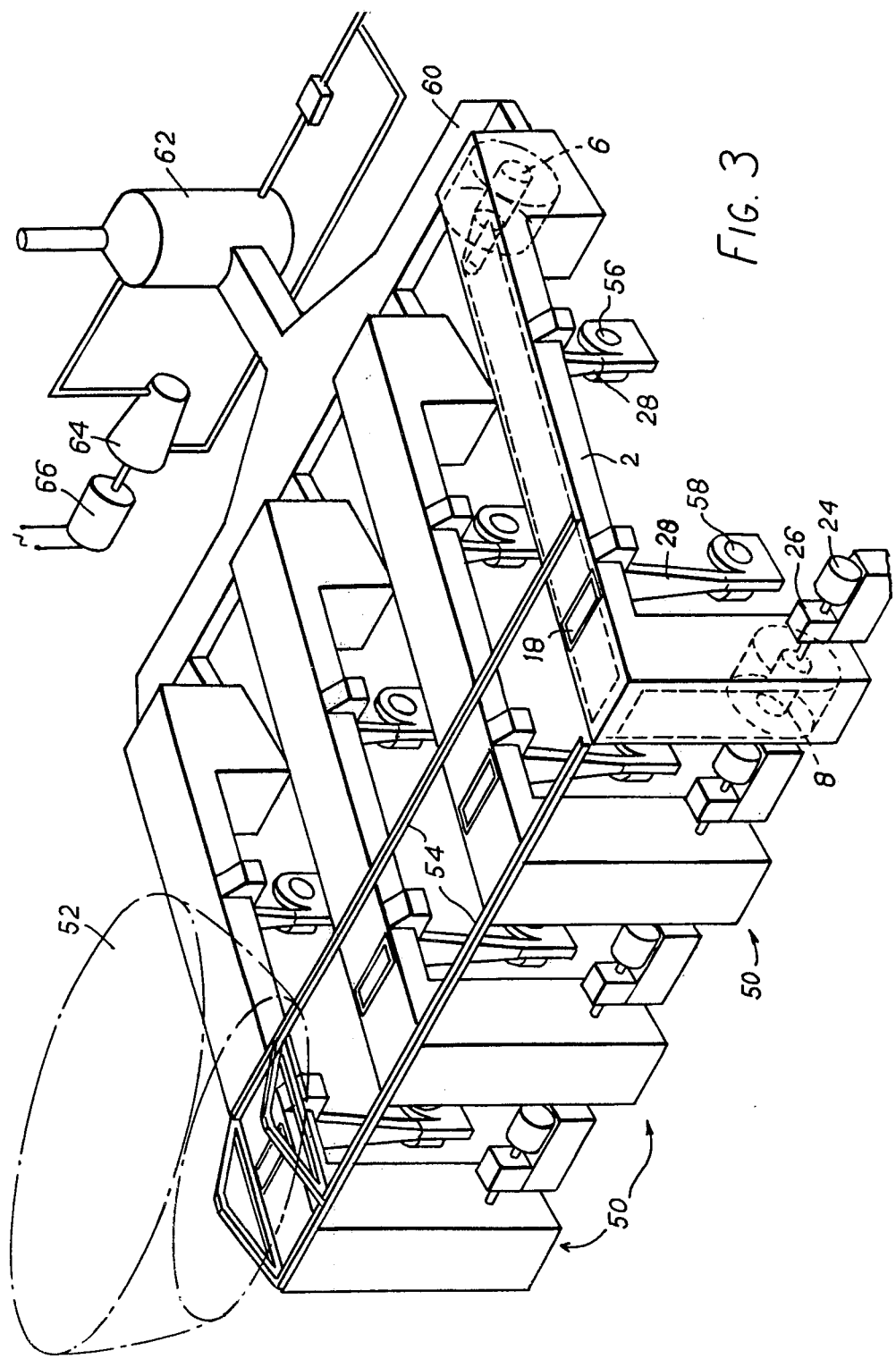

STORAGE OF THERMAL ENERGY

BACKGROUND OF THE INVENTION

This invention relates to the storage of thermal energy, in particular but not exclusively the storage of energy received from solar heating.

The increasing interest in the use of solar energy in recent years had indicated the need for means to store thermal energy for periods of at least several hours, and preferably for considerably longer periods. Methods proposed so far include the storage of energy in hot water, in particular for domestic use, or in refractories or phase-changing salts. These methods all have their limitations. The maximum temperature that can be realised with heat energy storage in water or in phase-changing salts is very restricted, while the storage process in refractories is slow due to the bulk of the material. All the methods in fact require bulky and therefore expensive installations.

SUMMARY OF THE INVENTION

According to the present invention, there is provided a thermal energy storage apparatus comprising a heat-insulating casing providing a container for a heat storage member in the form of a length of flexible material, the casing having a region in which external energy can pass to the member to heat it and there being means for directing the flexible member progressively through said region and winding the heated member into a coil to store the thermal energy it holds.

The apparatus may comprise first and second winding drums or mandrels to which respective ends of the flexible member are attached. The material is then wound from the first mandrel to the second mandrel when heat is to be stored, the material moving through said external energy heating region on its passage between the mandrels, and the thermal energy being extracted while the material is being returned from the second mandrel to be rewound on the first mandrel.

The stored energy is preferably extracted from the flexible member by passing a fluid in heat exchange relation with the unwound material. This allows the rate of heat extraction to be varied by altering the mass flow rate of the acceptor fluid, by altering the surface area of the member exposed to the fluid flow, and/or by altering the unwinding rate of the material.

It is also possible to use a heated fluid in a similar manner to heat the flexible member. However, the invention is particularly suitable for the storage of solar energy, and focusing means may then be provided to increase the input heat flux from outside the casing to the flexible member.

The invention will be described in more detail with reference to the accompanying drawings.

BRIEF DESCRIPTION OF THE DRAWINGS

FIGS. 1 and 2 illustrate one form of thermal storage apparatus according to the invention, FIG. 1 being a cross-section on the plane X-X in FIG. 2, which is an end view of the apparatus, and, FIG. 3 illustrates the use of a battery of thermal storage units, each similar to the apparatus in FIGS. 1 and 2, in an electrical generating plant.

DESCRIPTION OF THE PREFERRED EMBODIMENTS

The thermal storage apparatus of FIGS. 1 and 2 comprises a pressure-tight casing 2 lined with heat insulating material 4 such as a ceramic fibre material. At spaced positions within the casing are rotatably mounted two rolls or mandrels 6,8. A heat storage member in the form of a long strip of flexible material 10 is attached by its ends to the mandrels and can thus be coiled onto either of them. In this example the material takes the form of a thin blanket, sheet or web, woven or non-woven, but it will be understood without further illustration that other forms can be used such as a wire or flexible bar. Guide rollers 12, 14, 16 are also rotatably mounted within the casing so that the flexible member is kept spaced from the casing walls.

A window 18 is provided in the casing in the path of the sheet material between the mandrels and the material is heated by radiant thermal energy as it passes the window, with the aid of focusing means (shown only in FIG. 3 at 52) if required. The window may be made of a heat-resistant glass having good radiation transmission characteristics, but in higher-temperature applications more heat-resistant materials such as fused silica (quartz) may be required. The window is mounted in a temperature-resistant seal 22 able to withstand a positive pressure within the casing.

Both mandrels can be driven to wind the flexible material from one to the other, as by the motor 24 shown for the mandrel 6 in FIG. 2 and a similar drive for the mandrel 8. The motor output is connected to the mandrel through an infinitely variable gear 26 as illustrated, or a DC motor may be used with electrical control means (not shown) to vary its speed in known manner. It will be clear that as the material is wound onto one of the mandrels, in this illustrated example the mandrel 6, it is progressively heated along its length by exposure to the radiation through the window 18. The mandrel 6 thus eventually contains substantially all the flexible member in a heated state and in a closely coiled form. It may be noted that coiling the material reduces very substantially its exposed surface area as compared with the material in its unwound state between the mandrels. In other words the form of the material is most susceptible to heat transfer when being heated as it moves between the mandrels and is least susceptible to heat transfer when collected in a coil after it has been heated.

The heating is preferably controlled so as to raise the temperature of the material to a predetermined value. The temperature can be measured as the exposed material moves away from the window 18 by a sensor 27, which can be a thermocouple, a proximity sensor or a radiation pyrometer, and the signal used to control the drive of the mandrel 6. Thus, if the incident radiation drops the progress of the material between the mandrels will be slowed and if the radiation ceases the drive will be stopped.

To release the stored thermal energy a gas is blown through one or more ducts 28 into the casing by forced draft fans 30. As it flows towards one or more exit ducts 32, the gas passes over the exposed surfaces of the material and is heated thereby. During this process the material is rewound from the mandrel 6 to the mandrel 8 so continuously exposing fresh heated surfaces to the gas flow.

The heated gas provides the energy output from the apparatus. The power available depends not only on the temperature to which the flexible material has been heated but also on its speed of rewinding and on the gas flow rate. A controllable bypass 34 may be provided, having valve means 34a, to vary the length, and therefore the effective surface area, of the flexible material exposed to the gas flow. Use of the bypass leads off a part of the gas flow over the major part of the unreeled length of the material and is able to provide a fine control of the heat take-up rate. For optimum control there may also be a temperature detector 36 the signal from which is used to regulate the rewind speed to ensure that the flexible material is cooled to a predetermined temperature by the gas flow.

For relatively high maximum operating temperatures, the flexible member will conveniently be made of metal. Within its upper temperature limit aluminium may be an appropriate choice but for higher temperatures it may be necessary to use a stainless steel. At lower maximum temperatures, glass fibre composites (up to 300°–400° C.) may provide a more economical heat storage material, conveniently being employed in the form of a woven web or a more open mesh. The gas used may be air for lower temperature applications but with higher temperatures it may be necessary to choose another gas to avoid corrosion or other unwanted chemical reactions. For example, carbon dioxide may be an appropriate choice for temperatures of up to about 700° C. to retard oxidation of stainless steel.

The heated gas output can be used in any suitable manner. At lower temperatures air can be heated to be used directly for space heating, or to power a desalination plant or a vapour absorbtion cycle refrigeration plant. The energy can thus be used for an air conditioning installation, providing heating when required and also operating a lithium bromide or ammonia vapour absorbtion refrigeration plant for cooling and/or dehumidifying. At higher temperatures the heated gas may be used to operate a thermal power plant, as for example the steam raising installation of an electrical generating plant. It will be clear without needing any further illustration that the same gas ducts 28 or further similar gas ducts can be used to pass preheated fluid over the flexible material so that the material is heated by the fluid instead of by radiant solar energy. The apparatus may thus be arranged to operate with alternative heat inputs, or can even be arranged to function solely as a storage means for energy from a hot fluid, in which case it would be unnecessary to provide a window for a radiant heat input.

FIG. 3 is an example of the use of the invention for electrical power generation. The plant comprises a battery of thermal energy storage units 50, each similar to the apparatus already described and the same reference numbers being used to indicate corresponding parts.

A common solar radiation collector 52 is mounted on rails 54 traversing the battery of storage units so that it can focus radiation on the window 18 of each in turn, but it will be understood without further illustration that it is possible alternatively for each unit to have its own fixed collector. To produce a gas flow over its heated sheet material when the stored energy is to be recovered, each unit has a low rate fan 56 and a boost fan 58. The hot gases are taken through a collector manifold 60 to be used as the power source of a steam raising plant 62, which may itself be of generally conventional design, the steam powering a turbine 64 to drive an electrical generator 66. The heated gas flow may operate on a closed cycle with the cooled gases returning from the steam raising plant through ducting (not shown) to the fans 56, 58.

This cycle is one in which the heat storage material preferably reaches a relatively high maximum temperature, e.g. about 650° C. At this temperature certain grades of stainless steel can store up to 110 kwhr/tonne and 20 tone coils of stainless steel sheet are commercially available. The installation illustrated, with four coils, could thus be able to store some 9000 kwhr. If each coil is rewound in 5 hours in turn, the mean energy release will be 450 kw, but if the installation is used for peak topping or other intermittent use, each unit might be operated to release as much as 2 Mw.

What is claimed is:

1. A thermal energy storage apparatus comprising a heat-insulated casing, an elongate flexible heat storage member within the casing, respective rotary mounting members at spaced positions within the casing, opposite ends of the flexible member being attached to the respective mounting members, a path for said flexible member extending within the casing between said mounting members, and drive means connected to said mounting members for rotating said members to displace the flexible member through the casing interior along said path in either direction alternatively to coil the flexible member on either of said mounting members selectively, means disposed in the path of the member at a region intermediate the respective mounting members for the passage of heat from the exterior to said flexible member within the casing as it is progressively passed along said path by said drive means, the thermal energy received by the flexible member being stored in the member while it is collected in the form of a coil on one of said mounting members, and means for the extraction of stored heat from the flexible member comprising inlet and outlet fluid connections to and from the casing and fluid passage means within the casing between said connections for the flow of heat transfer fluid over the flexible member to be heated by said member, said fluid passage means being disposed in the path of the member intermediate the respective mounting members for contact with said flexible member between the mounting members as the flexible member is progressively passed along said path by the drive means.

2. A solar energy storage apparatus comprising a plurality of heat insulating casings, an elongate flexible heat storage member within each casing, respective rotary mounting means within each casing for opposite ends of the flexible member, and drive means rotating said mounting means for progressing the flexible member along a path between said mounting means in either direction alternatively to coil it upon either of said mounting means selectively, an energy input wall region being provided in each casing adjacent said material path therethrough for the passage of radiant solar energy from the exterior to impinge upon said member, focusing means disposed outside the casing for focusing said radiant energy upon the member between its associated mounting means to heat said member as it is progressively passed along said path by said drive means, thermal energy received by the flexible member being stored in the member while it is collected in a coil on the selected mounting means, means for guiding said focusing means displaceably, said focusing means being selectively locatable in register with the energy input wall region of each casing to focus radiant energy upon the members in the different casings in turn, means for the extraction of stored heat from the flexible members comprising inlet and outlet connections to and from the casing and fluid passage means in the casings between said inlet and outlet connections for the flow of heat transfer fluid over the flexible members to be heated by said members, said fluid passage means being disposed in the paths of the members between their associated mounting means for heat transfer contact with said flexible members between the mounting means as the flexible members are progressively passed along their paths by the drive means.

3. A solar energy storage apparatus according to claim 2 wherein each casing is provided with fluid inlet and outlet conduit means for the passage of a fluid in heat transfer relation with the flexible member to extract heat from said member, a collector manifold for the heated fluid communicating with all said outlet conduit means.

4. A thermal energy storage apparatus comprising a heat-insulated casing, an elongate flexible heat storage member within the casing, respective rotary mounting members at spaced positions within the casing, opposite ends of the flexible member being attached to the respective mounting members, a path for said flexible member extending within the casing between said mounting members for rotating said members to displace the flexible member through the casing interior along said path in either direction alternatively to coil the flexible member on either of said mounting members selectively, means for the transfer of heat between the exterior of said casing and said flexible member within the casing for the storage of heat in said flexible member and the extraction of stored heat therefrom said means comprising inlet and outlet fluid connections into and from the casing and fluid passage means with the casing between said connections for the flow of heat transfer fluid over the flexible member, said fluid passage means being disposed in the path of the flexible member intermediate the respective mounting members said fluid being in heat transfer contact with the flexible member between the mounting members as said flexible member is progressively passed along said path by said drive means and thermal energy received by the flexible member being stored in the member while it is collected in the form of a coil on one of said mounting members.

5. A thermal energy storage apparatus according to claim 4 wherein temperature sensing means are disposed in the vicinity of said heat input region for regulating the speed of displacement of the flexible member past said heat passage means to control the temperature of the material.

6. A thermal energy storage apparatus according to claim 4 wherein said heat input means comprises a casing wall portion of a material through which radiant energy can readily pass, said wall portion being disposed over the path of the member between said engagement means, whereby the member is heated by said radiant energy.

7. A thermal energy storage apparatus according to claim 1 wherein means are provided externally of the casing for focusing said radiant energy onto said region.

8. A thermal energy storage apparatus according to claim 4 wherein the flexible storage member is made of metal.

9. A thermal energy storage apparatus according to claim 4 wherein the flexible storage member is made of a glass fibre composite material.

* * * * *